(12) United States Patent
Hu

(10) Patent No.: US 10,015,870 B2
(45) Date of Patent: Jul. 3, 2018

(54) LIGHT ATTENUATION CONTROLLING APPARATUS AND METHOD FOR A CDM LAMP

(71) Applicants: Jun Hu, Guangzhou, Guangdong (CN); Jian Huang, Guangzhou, Guangdong (CN)

(72) Inventor: Jun Hu, Guangdong (CN)

(73) Assignee: GUANGZHOU TRIZ INFORMATION TECHNOLOGY LTD., Guangzhou (CN)

( * ) Notice: Subject to any disclaimer, the term of this patent is extended or adjusted under 35 U.S.C. 154(b) by 0 days.

(21) Appl. No.: 15/401,191

(22) Filed: Jan. 9, 2017

(65) Prior Publication Data

US 2017/0215262 A1  Jul. 27, 2017

(30) Foreign Application Priority Data

Dec. 10, 2015  (CN) .......................... 2015 1 09200046

(51) Int. Cl.
*H05B 41/288* (2006.01)
*H05B 41/28* (2006.01)

(52) U.S. Cl.
CPC ..... *H05B 41/2883* (2013.01); *H05B 41/2887* (2013.01)

(58) Field of Classification Search
CPC ... H05B 41/2883; H05B 41/288; H05B 41/28
USPC ...................................... 315/200 R
See application file for complete search history.

(56) References Cited

U.S. PATENT DOCUMENTS

| 2004/0113567 | A1* | 6/2004 | Yamauchi | H05B 41/2882 315/291 |
| 2005/0194916 | A1* | 9/2005 | Okawa | H05B 41/38 315/308 |
| 2007/0285032 | A1* | 12/2007 | Fukuda | H05B 41/2928 315/307 |
| 2010/0134048 | A1* | 6/2010 | Pancani | H05B 41/2886 315/307 |
| 2012/0306395 | A1* | 12/2012 | Hirsch | H01J 61/125 315/200 R |

(Continued)

FOREIGN PATENT DOCUMENTS

| CA | 2724428 A1 * | 11/2009 | ......... H05B 41/2883 |
| WO | WO 2015015442 A1 * | 2/2015 | ......... H05B 41/2883 |

*Primary Examiner* — Dylan White
(74) *Attorney, Agent, or Firm* — Dragon Sun Law Firm, P.C.; Jinggao Li, Esq.

(57) ABSTRACT

The present disclosure relates to a light attenuation controlling apparatus for a CDM lamp, comprising: a full-bridge inverter as a power source to supply an output to the CDM lamp; a driving circuit for driving the full-bridge inverter; a single-chip microcomputer connected to the driving circuit; a tube voltage sensing module, one end of which is connected to the full-bridge inverter so as to sense a tube voltage currently outputted by the full-bridge inverter to the CDM lamp, and through the other end of which the tube voltage of the CDM lamp is outputted to the single-chip microcomputer. The present disclosure provides a novel light attenuation controlling apparatus for a CDM lamp, which can effectively control light attenuation of the CDM lamp by constantly regulating the output of the full-bridge inverter, thereby enhancing duration of the CDM lamp.

8 Claims, 2 Drawing Sheets

(56) References Cited

U.S. PATENT DOCUMENTS

2016/0205754 A1\* 7/2016 Rapson .............. H05B 41/2883
 315/112
2017/0215263 A1\* 7/2017 Hu ...................... H02M 1/4208

\* cited by examiner

LIGHT ATTENUATION CONTROLLING APPARATUS AND METHOD FOR A CDM LAMP

FIELD OF THE INVENTION

The present disclosure relates to the field of lighting, and particularly to a light attenuation controlling apparatus and method for a CDM lamp.

A Ceramic Discharge Metal-Halide (CDM) Lamp (i.e., a CDM lamp) is generally referred to as a Ceramic Metal Halide (CMH) Lamp. CDM lamps have a superb performance. However, with increase of their illumination time, they become increasingly demanding on the voltage needed for starting, and light attenuation also becomes more and more serious, such that the CDM lamp cannot be started by an original starting circuit before reaching their theoretical service life, while the light source of the CDM lamp per se is not damaged yet.

SUMMARY OF THE INVENTION

In view of the problems above, the present disclosure provides a light attenuation controlling apparatus for a CDM lamp, characterized in that the apparatus comprises:

a full-bridge inverter as a power source to supply an output to the CDM lamp;

a driving circuit for driving the full-bridge inverter;

a single-chip microcomputer connected to the driving circuit;

a tube voltage sensing module, one end of which is connected to the full-bridge inverter so as to sense a tube voltage currently outputted by the full-bridge inverter to the CDM lamp, and through the other end of which the tube voltage of the CDM lamp is outputted to the single-chip microcomputer, wherein:

the single-chip microcomputer controls the driving circuit based on the sensed tube voltage of the CDM lamp so as to regulate the output of the full-bridge inverter, thereby controlling light attenuation of the CDM lamp.

Besides, the present disclosure further provides a light attenuation controlling method for a CDM lamp, wherein:

the method is applied to a light attenuation controlling apparatus for a CDM lamp, the apparatus comprises:

a full-bridge inverter as a power source to supply an output to the CDM lamp;

a driving circuit for driving the full-bridge inverter;

a single-chip microcomputer connected to the driving circuit;

a tube-voltage sensing module, one end of which is connected to the full-bridge inverter so as to sense a tube voltage currently outputted by the full-bridge inverter to the CDM lamp, and the other end of which is connected to the single-chip microcomputer, characterized in that:

the method specifically comprises steps of:

S100: when the apparatus is working, detecting whether a DC input voltage is present at an input side of the full-bridge inverter; in the case of absence, determining that an abnormality exists at the input side of the full-bridge inverter; in the case of presence, proceeding to next step;

S200: outputting, by the tube voltage sensing module, the sensed tube voltage of the CDM lamp to the single-chip microcomputer;

S300: controlling, by the single-chip microcomputer, the driving circuit based on the sensed tube voltage of the CDM lamp so as to regulate the output of the full-bridge inverter, thereby controlling light attenuation of the CDM lamp.

The present disclosure has the following features: by constantly regulating the output of the full-bridge inverter, light attenuation of the CDM lamp can be effectively controlled, and duration of the CDM lamp can be increased.

BRIEF DESCRIPTION OF THE ACCOMPANYING DRAWINGS

DETAILED DESCRIPTION OF THE PREFERRED EMBODIMENTS

Figure 1:
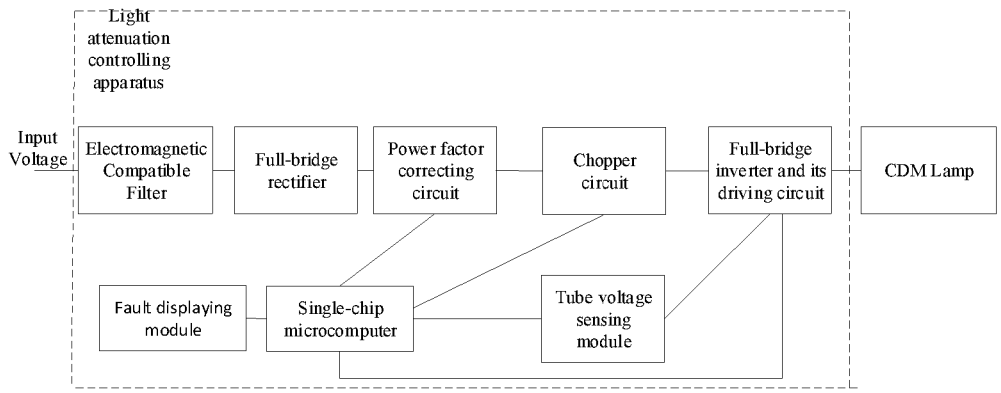
FIG. 1 is a schematic diagram of one embodiment in the present disclosure.

Each embodiment in the present specification is described in a progressive manner, focusing on differences from other embodiments; same or similar parts between various embodiments may be referenced with one another.

In one embodiment, there is disclosed a light attenuation controlling apparatus for a CDM lamp, characterized in that the apparatus comprises:

a full-bridge inverter as a power source to supply an output to the CDM lamp;

a driving circuit for driving the full-bridge inverter;

a single-chip microcomputer connected to the driving circuit;

a tube voltage sensing module, one end of which is connected to the full-bridge inverter so as to sense a tube voltage currently outputted by the full-bridge inverter to the CDM lamp, and through the other end of which the tube voltage of the CDM lamp is outputted to the single-chip microcomputer, wherein:

the single-chip microcomputer controls the driving circuit based on the sensed tube voltage of the CDM lamp so as to regulate the output of the full-bridge inverter, thereby controlling light attenuation of the CDM lamp.

In this embodiment, a full-bridge inverter is employed to supply an AC power source to the CDM lamp. A most unique part of the embodiment is that a single-chip microcomputer is employed to control the driving circuit of the full-bridge inverter, such that when the CDM is working, the single-chip microcomputer will attempt to control light attenuation by regulating the output of the full-bridge inverter. The basis for the controlling is the tube voltage sensed by the tube voltage sensing module. In the light attenuation controlling apparatus of this embodiment, during the controlling procedure, each time of outputting by the full-bridge inverter is controlled by the driving circuit, while the driving circuit is controlled by the single-chip microcomputer.

For regulating the output of the full-bridge inverter, common technical means may consider PWM modulation, i.e., pulse width modulation. Besides regulating the pulse width, the output of the full-bridge inverter may be regulated by regulating a cycle. Of course, it is the single-chip microcomputer that regulates the output of the full-bridge inverter by controlling the driving circuit.

In another embodiment, the single-chip microcomputer controls the driving circuit based on the sensed tube voltage of the CDM lamp according to a preset control policy.

Regarding the above embodiment, to facilitate a better understanding, it is assumed that during the procedure of light attenuation control, the output of the full-bridge inverter is a PWM waveform outputted to the full-bridge inverter under control of the driving circuit:

Supposing that after the single-chip microcomputer obtains the current tube voltage of the CDM lamp, it is needed to regulate the output voltage of the full-bridge inverter once according to the preset light attenuation control policy; then: the single-chip microcomputer transmits an instruction/parameter to the driving circuit to require it to change the output of the full-bridge inverter, and the driving circuit then starts continuously outputting a PWM waveform with a cycle of T0 and a duration of T1; correspondingly, the full-bridge inverter continuously outputs to the CDM lamp within the duration T1. From the perspective of controlling light attenuation, an objective of this control is to attempt to control the tube voltage of the CDM lamp so as not to cause the tube voltage too high. During the procedure of light attenuation control, the tube voltage sensing module senses the tube voltage of the CDM lamp in real-time, and outputs it to the single-chip microcomputer so as to be available for the single-chip microcomputer to regulate the output voltage of the full-bridge inverter.

Supposing the tube voltage sensed by the tube voltage sensing module still does not satisfy the light attenuation control policy preset by the single-chip microcomputer after regulating the output voltage of the full-bridge inverter at this time, the single-chip microcomputer still needs to re-regulate the output voltage of the full-bridge inverter. Then, the single-chip microcomputer is only needed to re-regulate an output voltage of the full-bridge inverter based on the tube voltage of the current CDM lamp according to the preset light attenuation control policy; at this point, the single-chip microcomputer is very likely needed to transmit a new instruction/parameter to the driving circuit.

Such preset light attenuation control policy may be totally determined by experimental study and statistical analysis on the tube voltage and variation of the tube voltage when the CDM lamp is working. For each kind of CDM lamp, there will be an optimal tube voltage, which can not only guarantee its illumination effect, but also can benefit its duration or service life. Even when a new kind of CDM lamp emerges, the preset light attenuation control policy may also be updated. In this way, under a precondition of no fault, it is guaranteed that after all light attenuation control policies are executed, the CDM lamp works in an optimal state to a most extent.

For PWM modulation, it may regulate the output voltage of the inverter and/or the output pulse width of the inverter.

By regulating the output voltage and/or pulse width of the full-bridge inverter, during working of the CDM lamp, the embodiment may regulate an energy density for supplying power thereto, so as to guarantee that the CDM lamp works in an optimal state to the most extent. In other words, the embodiment can solve the problem in the prior art that light attenuation of the CDM lamp cannot be effectively controlled with increase of use time.

In another embodiment, based on the tube voltage of the CDM lamp currently in an on state and a fuzzy calculation of the real-time voltage within a short time after power on (e.g. within a time of about 7-10 s), the single-chip microcomputer may control the driving circuit after comparing one tube voltage value after fuzzy calculation with a tube voltage in the database. In this embodiment, different settings of the short time may cause the embodiment to reflect a certain predictivity and foresight. In particularity, when it is desired that the tube voltage does not exceed a certain set value, based on this prediction, the embodiment may control the tube voltage of the CDM lamp below the set value to the most extent to guarantee that the tube voltage of the CDM lamp will not exceed the certain set value. If the set value is the optimal tube voltage, the embodiment can enhance the effect of light attenuation control to the utmost extent, which greatly prolongs duration of the CDM lamp.

This apparently utilizes the preset light attenuation control policy mentioned above, which can be surely determined based on experimental study and statistical analysis on the tube voltage and variation of the tube voltage when the CDM lamp is working. For each kind of CDM lamp, it has an optimal tube voltage, which can not only guarantee its illumination effect, but also benefit its duration or service life. If the tube voltage is controlled not to exceed the optimal tube voltage to the most extent, the effect of light attenuation control will be significantly enhanced, and duration of the CDM lamp will be greatly prolonged.

More preferably, through experimental study and statistical analysis on the tube voltage variation of the tube voltage when the CDM is working, for different performance situations of the CDM lamp, the present disclosure may count corresponding optimal tube voltages with respect to different situations so as to combine them into the controlling of the embodiment above, such that during the whole life cycle of the CDM lamp, the tube voltage is controlled not to exceed the optimal tube voltage under a corresponding situation to the most extent.

Preferably, not only the output voltage of the full-bridge inverter is regulated, but also the output pulse width of the full-bridge inverter is regulated, which facilitates regulation of the energy density and controlling of the light attenuation.

The parameter/instruction involved in the light attenuation control policy may be pre-stored in a memory of the single-machine microcomputer in a form of database or other appropriate data storage form. When necessary, the single-machine microcomputer will access relevant parameters and instruction.

Besides, the tube voltage sensing module may be a hardware module, e.g., a peripheral circuit employing a certain chip and its matched components; it may also be a software module that uses the processing capability of the single-chip microcomputer per se and a matched peripheral circuit. It is easily understood that the matched peripheral circuit at least has a capability of sensing or computing the tube voltage when the CDM lamp is powered on, and a capability of feeding back the sensed or computed voltage value information to the tube voltage sensing module, so as to be available for the single-chip microcomputer to select an appropriate processing manner from the preset light attenuation control policy.

In another embodiment, the apparatus further comprises: a chopper circuit, an output end of which is connected to the full-bridge inverter so as to provide input to the full-bridge inverter, and a control end of which is connected to the single-chip machine such that the single-chip machine can regulate an output of the chopper circuit.

For this embodiment, the chopper circuit may provide a DC input for the full-bridge inverter. Besides, each time controlling of the driving circuit by the single-chip microcomputer causes change of the output of the full-bridge inverter, the input of the full-bridge inverter will have an appropriate input range. The input range may result in that an output of the full-bridge inverter desired by the single-chip microcomputer can be outputted regardless of how the driving circuit regulates the output. Therefore, in order to utilize the power energy more efficiently, the single-chip microcomputer may also control an output of the chopper circuit, as long as the output of the chopper circuit can satisfy the requirements of regulating the full-bridge inverter. Therefore, the embodiment also introduces the single chip machine's regulation with respect to the chopper circuit.

For this embodiment, the single-chip machine not only regulates the driving circuit and the full-bridge inverter, but also may regulate the chopper circuit. This embodiment may result in that each time the single-chip machine regulates the chopper circuit once, the output of the chopper circuit just satisfies input requirements of the full-bridge inverter; then the driving circuit regulates the full-bridge inverter such that the output of the full-bridge inverter just satisfies the single-chip machine's regulation objectives with respect to the full-bridge inverter. In this case, the embodiment can achieve an efficient regulation with respect to the chopper circuit and the full-bridge inverter, while guaranteeing efficient utilization of the power energy.

In another embodiment, the light attenuation controlling apparatus further comprises: a full-bridge rectifier that provides an output available for the chopper circuit. It is easily understood that the full-bridge rectifier provides a DC output available for the chopper circuit to use.

In another embodiment, the light attenuation controlling apparatus further comprises: a power factor correcting circuit, an input end of which is connected to an output end of the full-bridge rectifier, and a bus voltage output end of which is connected to an input end of the chopper circuit; moreover, the power factor correcting circuit is controlled by the single-chip microcomputer.

In this embodiment, the power factor correction circuit not only plays its inherent role (e.g., raising power factors of the line or system, reducing harmonic content, etc.), but also plays a special role for the embodiment: because the power factor correction circuit is controlled by the single-chip machine, the light attenuation controlling apparatus can be interfaced with CDM lamps with different optimal tube voltages, and also guarantees that when it is interfaced with the CDM lamps with different optimal tube voltages, the single-chip microcomputer can still regulate the power factor correcting circuit timely, ensuring that the power factor is always controlled at a level close to 1, thereby expanding support to CDM lamps with different working voltages.

In another embodiment, the light attenuation controlling apparatus also comprises an electromagnetic compatible filter, one end of which is connected to a mains supply, while the other end of which provides an output for the full-bridge rectifier to use. The electromagnetic compatible filter can inhibit electromagnetic interference in the present embodiment.

In another embodiment, the light attenuation controlling apparatus also comprises: a fault displaying module which can display fault information to alert the user whether an input side of the full-bridge inverter has abnormalities.

For example, when an abnormality exists, for this embodiment, if the input side of the full-bridge inverter has no voltage or the voltage is substandard, the single-chip microcomputer may determine that the input side of the full-bridge inverter has an abnormality according to a database in the memory, and transmit the fault information with respect to this fault to the fault displaying module. Furthermore, if the output side of the full-bridge inverter is open-circuit or short-circuit, or the working temperature of the light attenuation controlling apparatus per se exceeds a secure range, the fault information, after being sensed by a current sensor or a NTC temperature sensor or the like, may also be transmitted to the fault displaying module.

As illustrated in FIG. 1, a further embodiment shows a light attenuation controlling apparatus for a CDM lamp, comprising: an electromagnetic compatible filter, a full-bridge rectifier, a power factor correcting circuit, a chopper circuit, a full-bridge inverter and its driving circuit, a CDM lamp, a single-chip microcomputer, and a tube voltage sensing module. A trigger of the CDM lamp is not shown.

Figure 4:
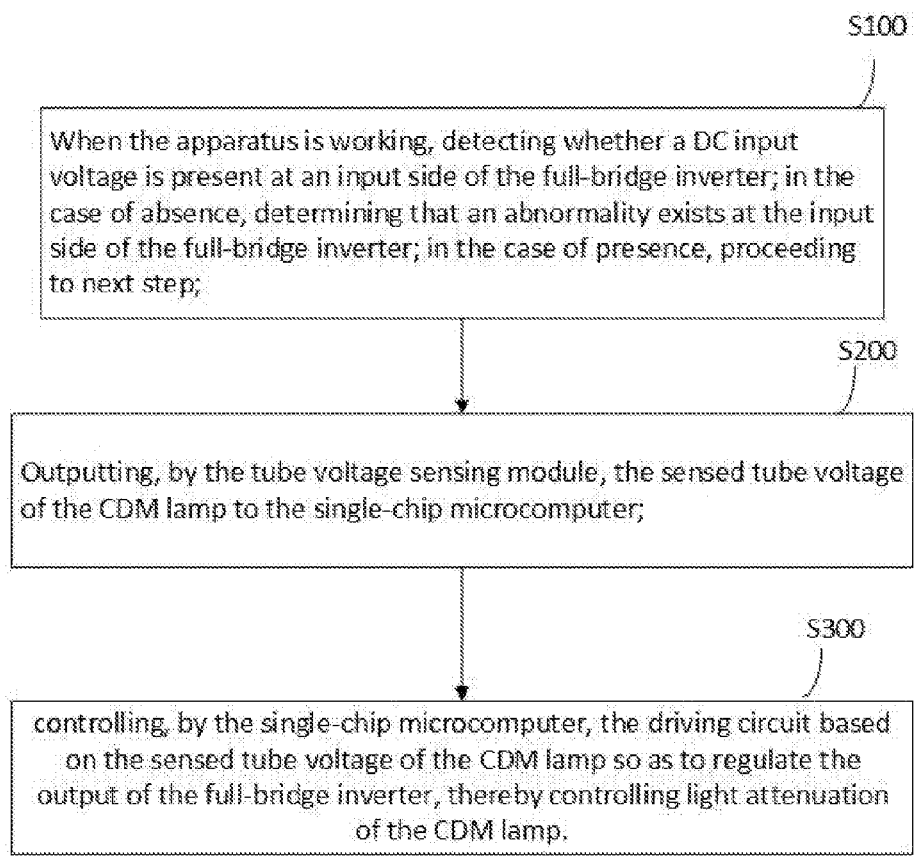
FIG. 4 is a light attenuation controlling method for a CDM lamp.

Besides, in an embodiment, the present disclosure also discloses a method applied to the light attenuation controlling apparatus for a CDM lamp, wherein the apparatus comprises:

a full-bridge inverter as a power source to supply an output to the CDM lamp;

a driving circuit for driving the full-bridge inverter;

a single-chip microcomputer connected to the driving circuit;

a tube-voltage sensing module, one end of which is connected to the full-bridge inverter so as to sense a tube voltage currently outputted by the full-bridge inverter to the CDM lamp, and the other end of which is connected to the single-chip microcomputer, characterized in that:

the method, as illustrated in FIG. 4, specifically comprises steps of:

S100: when the apparatus is working, detecting whether a DC input voltage is present at an input side of the full-bridge inverter; in the case of absence, determining that an abnormality exists at the input side of the full-bridge inverter; in the case of presence, proceeding to next step;

S200: outputting, by the tube voltage sensing module, the sensed tube voltage of the CDM lamp to the single-chip microcomputer;

S300: controlling, by the single-chip microcomputer, the driving circuit based on the sensed tube voltage of the CDM lamp so as to regulate the output of the full-bridge inverter, thereby controlling light attenuation of the CDM lamp.

For this embodiment, in conjunction with the embodiment of the light attenuation controlling apparatus, the role of the present embodiment will be easily understood.

In another embodiment, in the step S300, the single-chip microcomputer controls the driving circuit after comparing the sensed tube voltage of the CDM lamp and the tube voltage in the database.

In another embodiment, in the step S300, based on the tube voltage of the CDM lamp currently in an on state and a fuzzy calculation of the real-time voltage within a short time after power on (e.g. within a time of about 7-10 s), the single-chip microcomputer may control the driving circuit after comparing the tube voltage after fuzzy calculation with the tube voltage in the database. In this embodiment, different settings of the short time may cause the embodiment to reflect a certain predictivity and foresight. In particularity, when it is desired that the tube voltage does not exceed a certain set value, based on this prediction, the embodiment may control the tube voltage of the CDM lamp below the set value to the most extent to guarantee that the tube voltage of the CDM lamp will not exceed the certain set value. If the set value is the optimal tube voltage, the embodiment can enhance the effect of light attenuation control to the utmost extent, which greatly prolongs duration of the CDM lamp.

More preferably, through experimental study and statistical analysis on the tube voltage and variation of the tube voltage when the CDM is working, for different performance situations of the CDM lamp, the present disclosure may count corresponding optimal tube voltages with respect to different situations so as to combine them into controlling of the embodiment above, such that during the whole life cycle of the CDM lamp, the tube voltage is controlled not to exceed the optimal tube voltage under a corresponding situation to the most extent.

In another embodiment, a DC input voltage in the step S100 is provided through an output of the chopper circuit, and the single-chip microcomputer can regulate the output of the chopper circuit.

In another embodiment, input of the chopper circuit is a DC current, and the DC current is obtained through outputting of a full-bridge rectifier.

In another embodiment, the apparatus further comprises a power factor correcting circuit, an input end of which is connected to an output end of the full-bridge rectifier, while a bus line voltage output end of which is connected to an input end of the chopper circuit; moreover, the power factor correction circuit is controlled by the single-chip microcomputer.

In another embodiment, the apparatus further comprises an electromagnetic compatible filter, one end of which is connected to a mains supply, while the other end of which provides an output for the full-bridge rectifier to use.

In another embodiment, the apparatus further comprises: a fault displaying module which can display fault information to alert the user whether an input side of the full-bridge inverter has abnormalities in the step S100.

Figure 2:
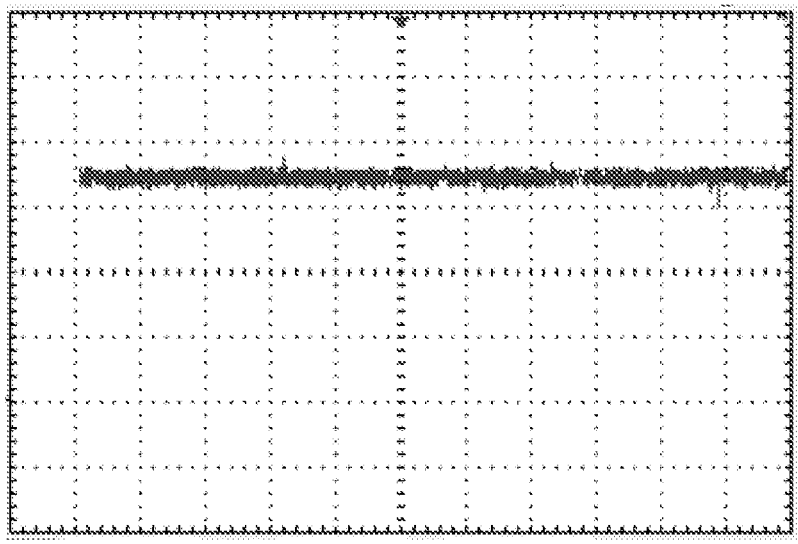
FIG. 2 is a schematic diagram of real-time sampling in the present disclosure.
Figure 3:
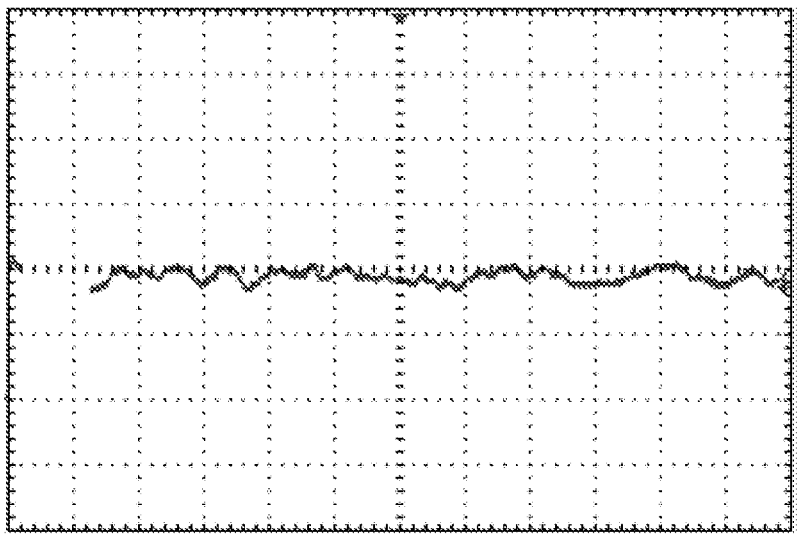
FIG. 3 is a waveform diagram after sensed data obtained from the real-time sampling are processed through fuzzy operation.

For various embodiments disclosed above, it is possibly needed to acquire in real time the current flowing through the CDM lamp in a very short time to calculate its tube voltage during a normal working state or sense in real-time the tube voltage of the CDM lamp in a very short time so as to feed back the tube voltage to the single-chip microcomputer to regulate the output of the full-bridge inverter. Suppose the following hexadecimal data are real-time AD sampling values measured in several seconds, as shown in FIG. 2, which reflects real-time dynamic characteristics of the current flowing through the CDM lamp:

For the sampling data above and what are shown in FIG. 2, they substantially vary in a range of 80-9 F, and the waveform vibration amplitude range substantially has no change. Supposing all other sampling data satisfying the data change rules above correspond to a certain corresponding value of a certain real-time tube voltage level in the database, after a relevant processing unit of the single-chip microcomputer performs a fuzzy operation, it may determine that the present CDM current is in a state of being a corresponding value in the database. FIG. 3 is a waveform diagram after sensed data obtained from the real-time sampling are processed through fuzzy operation. The relevant processing unit of the single-chip microcomputer emits a control signal to the driving circuit based on a comparison between the data represented by such kind of waveforms with the light attenuation control policy preset in the database. Similarly, if other real-time sampling is involved, the present disclosure may also consider a technical means of adopting fuzzy operation and comparing with the database so as to emit a control signal.

The light attenuation controlling apparatus and method for a CDM lamp provided by the present disclosure have been detailed above. In the present disclosure, specific examples are applied to expound the principle and embodiments of the present disclosure. Illustration of the embodiments above is only to facilitate understanding of the method of the present disclosure and its core idea. Meanwhile, to those skilled in the art, various may be made to the preferred embodiments and application scope according to the idea of the present invention. In view of the above, the content of the present disclosure should not be understood as limiting the present invention.

The invention claimed is:

1. A light attenuation controlling apparatus for a CDM lamp, comprising:
   a full-bridge inverter as a power source to supply an output to the CDM lamp;
   a driving circuit for driving the full-bridge inverter;
   a single-chip microcomputer connected to the driving circuit;
   a tube voltage sensing module, one end of which is connected to the full-bridge inverter so as to sense a tube voltage currently outputted by the full-bridge inverter to the CDM lamp, and through the other end of which the tube voltage of the CDM lamp is outputted to the single-chip microcomputer, wherein:
   the single-chip microcomputer controls the driving circuit based on the sensed tube voltage of the CDM lamp so as to regulate the output of the full-bridge inverter, thereby controlling light attenuation of the CDM lamp,
   a chopper circuit, an output end of which is connected to the full-bridge inverter so as to provide input to the full-bridge inverter, and a control end of which is connected to the single-chip machine such that the single-chip machine can regulate output of the chopper circuit;
   a full-bridge rectifier that provides an output available for the chopper circuit; and
   a power factor correcting circuit, an input end of which is connected to an output end of the full-bridge rectifier, and a bus voltage output end of which is connected to an input end of the chopper circuit, wherein the power factor correcting circuit is controlled by the single-chip microcomputer.

2. The apparatus according to claim 1, wherein the single-chip microcomputer controls the driving circuit based on the sensed tube voltage of the CDM lamp and a preset control policy.

3. The apparatus according to claim 1, wherein the tube voltage of the CDM lamp is controlled not to exceed an optimal tube voltage of the CDM lamp.

4. The apparatus according to claim 1, further comprising:
   a fault displaying module which can display fault information to alert the user whether an input side of the full-bridge inverter has abnormalities.

5. A light attenuation controlling method for a CDM lamp, wherein:
   the method is applied to a light attenuation controlling apparatus for a CDM lamp, the apparatus comprises:
   a full-bridge inverter as a power source to supply an output to the CDM lamp;
   a driving circuit for driving the full-bridge inverter;
   a single-chip microcomputer connected to the driving circuit;
   a tube-voltage sensing module, one end of which is connected to the full-bridge inverter so as to sense a tube voltage currently outputted by the full-bridge inverter to the CDM lamp, and the other end of which is connected to the single-chip microcomputer, characterized in that:
   the method specifically comprises steps of:
   S100: when the apparatus is working, detecting whether a DC input voltage is present at an input side of the full-bridge inverter; in the case of absence, determining that an abnormality exists at the input side of the full-bridge inverter; in the case of presence, proceeding to next step;

S200: outputting, by the tube voltage sensing module, the sensed tube voltage of the CDM lamp to the single-chip microcomputer;

S300: controlling, by the single-chip microcomputer, the driving circuit based on the sensed tube voltage of the CDM lamp so as to regulate the output of the full-bridge inverter, thereby controlling light attenuation of the CDM lamp, wherein a DC input voltage in the step S100 is provided through an output of the chopper circuit, and the single-chip microcomputer can regulate an output of the chopper circuit;

the apparatus further comprises a power factor correcting circuit, an input end of which is connected to an output end of the full-bridge rectifier, and a bus voltage output end of which is connected to an input end of the chopper circuit; moreover, the power factor correcting circuit is controlled by the single-chip microcomputer; and the apparatus further comprises a power factor correcting circuit, an input end of which is connected to an output end of the full-bridge rectifier, and a bus voltage output end of which is connected to an input end of the chopper circuit; moreover, the power factor correcting circuit is controlled by the single-chip microcomputer.

6. The method according to claim 5, wherein
in the step S300, the single-chip microcomputer controls the driving circuit based on the sensed tube voltage of the CDM lamp and a preset control policy.

7. The method according to claim 5, wherein
in the step S300, a maximum tube voltage of the CDM lamp is controlled not to exceed an optimal tube voltage of the CDM lamp to a most extent.

8. The method according to claim 5, wherein
the apparatus further comprises a fault displaying module which can display fault information to alert the user whether an input side of the full-bridge inverter has abnormalities.

\* \* \* \* \*